US010459616B2

(12) United States Patent
Helm et al.

(10) Patent No.: US 10,459,616 B2
(45) Date of Patent: Oct. 29, 2019

(54) AUTOMATIC FULL SCREEN DISPLAY

(71) Applicant: Toyota Motor Engineering & Manufacturing North America, Inc., Erlanger, KY (US)

(72) Inventors: Sean L. Helm, Saline, MI (US); Jeffrey E. Pierfelice, Canton, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 600 days.

(21) Appl. No.: 15/099,705

(22) Filed: Apr. 15, 2016

(65) Prior Publication Data

US 2017/0300216 A1 Oct. 19, 2017

(51) Int. Cl.
*G06F 3/0484* (2013.01)
*G06F 3/0481* (2013.01)
*G06F 3/0488* (2013.01)
*G01C 21/36* (2006.01)
*G09G 5/00* (2006.01)
*G06F 3/16* (2006.01)
*G09G 5/14* (2006.01)

(52) U.S. Cl.
CPC ..... *G06F 3/04847* (2013.01); *G01C 21/3664* (2013.01); *G06F 3/0481* (2013.01); *G06F 3/04842* (2013.01); *G06F 3/04886* (2013.01); *G09G 5/00* (2013.01); *G06F 3/167* (2013.01); *G06F 2203/04803* (2013.01); *G09G 5/14* (2013.01); *G09G 2320/0606* (2013.01); *G09G 2320/0613* (2013.01); *G09G 2340/0407* (2013.01); *G09G 2340/0464* (2013.01); *G09G 2340/14* (2013.01); *G09G 2380/10* (2013.01)

(58) Field of Classification Search
CPC .................. G06F 2203/04803; G06F 3/04842
See application file for complete search history.

(56) References Cited

U.S. PATENT DOCUMENTS

| 6,006,161 | A | 12/1999 | Katou |
| 6,892,135 | B1 | 5/2005 | Krull et al. |
| 6,928,262 | B1 * | 8/2005 | Kanemitsu ............. H04H 60/47 348/14.01 |
| 7,308,359 | B1 | 12/2007 | Krull et al. |
| 7,698,063 | B2 | 4/2010 | Kim |

(Continued)

Primary Examiner — William L Bashore
Assistant Examiner — Nathan K Shrewsbury
(74) Attorney, Agent, or Firm — Christopher G. Darrow; Darrow Mustafa PC

(57) ABSTRACT

An on-board vehicle navigation system (NAV system) may provide a variety of information and may be integrated with a variety of on-board vehicle systems or features. The NAV system may have the display set to show information about a single system in a full screen mode or have the display divided to show information about multiple systems simultaneously (mixed display mode). The NAV system may allow the user to select an automatic switching from a mixed display mode to a full display mode upon the occurrence of predetermined system conditions. The full display mode may be temporary and automatically return back to the previous display mode or may require a user acknowledgement prior to returning back to the previous display mode. The switch to the full display mode allows more information to be communicated to the user.

18 Claims, 4 Drawing Sheets

(56) References Cited

U.S. PATENT DOCUMENTS

| | | | |
|---|---|---|---|
| 7,817,168 B2* | 10/2010 | Nagiyama | G06F 3/0482 345/661 |
| 9,052,197 B2 | 6/2015 | van Os et al. | |
| 9,176,749 B2* | 11/2015 | Kim | G06F 3/0488 |
| 9,513,744 B2* | 12/2016 | Pryor | G01C 21/3664 |
| 9,532,111 B1* | 12/2016 | Christie | H04N 21/4788 |
| 9,712,741 B2* | 7/2017 | Kothari | B60R 11/0235 |
| 2003/0007227 A1* | 1/2003 | Ogino | B60K 35/00 359/227 |
| 2004/0193371 A1* | 9/2004 | Koshiji | G01C 21/3688 701/455 |
| 2004/0204823 A1* | 10/2004 | Hashimoto | G01C 21/3688 701/459 |
| 2006/0140448 A1* | 6/2006 | Fujii | G01C 21/20 382/104 |
| 2007/0208498 A1* | 9/2007 | Barker | G08G 1/0104 701/117 |
| 2007/0276596 A1* | 11/2007 | Solomon | G01C 21/3632 701/431 |
| 2007/0297064 A1* | 12/2007 | Watanabe | B60K 35/00 359/630 |
| 2008/0033644 A1 | 2/2008 | Bannon | |
| 2008/0211654 A1* | 9/2008 | Kasamatsu | B60K 35/00 340/461 |
| 2009/0102632 A1* | 4/2009 | Kobayashi | B60K 35/00 340/438 |
| 2010/0198497 A1* | 8/2010 | Okuno | G01C 21/36 701/533 |
| 2010/0273510 A1* | 10/2010 | Herman | B60R 11/02 455/456.3 |
| 2011/0107272 A1* | 5/2011 | Aguilar | G06F 3/04815 715/853 |
| 2012/0127139 A1* | 5/2012 | Hayami | G06F 8/61 345/204 |
| 2012/0242510 A1* | 9/2012 | Choi | G01C 21/3688 340/988 |
| 2013/0190978 A1* | 7/2013 | Kato | G01C 21/3664 701/36 |
| 2013/0218460 A1* | 8/2013 | Kim | G01C 21/26 701/461 |
| 2014/0168243 A1* | 6/2014 | Huang | G06T 1/20 345/522 |
| 2014/0309806 A1* | 10/2014 | Ricci | B60Q 1/00 701/1 |
| 2014/0309870 A1* | 10/2014 | Ricci | H04W 4/21 701/36 |
| 2015/0232065 A1* | 8/2015 | Ricci | H04W 4/21 701/36 |
| 2016/0026384 A1* | 1/2016 | Hwang | G06F 3/04886 715/773 |
| 2016/0054142 A1* | 2/2016 | Holmes | G06F 3/04817 701/537 |
| 2016/0162130 A1* | 6/2016 | Yoon | G06F 3/04842 715/748 |
| 2016/0165040 A1* | 6/2016 | Queru | B60K 35/00 455/418 |
| 2016/0343256 A1* | 11/2016 | Song | H04W 4/029 |
| 2016/0352818 A1* | 12/2016 | Han | G06F 9/4893 |
| 2017/0013188 A1* | 1/2017 | Kothari | B60R 11/0235 |
| 2017/0168782 A1* | 6/2017 | Boyd | G06F 8/34 |
| 2017/0180814 A1* | 6/2017 | Stathacopoulos | H04N 21/4882 |
| 2017/0269704 A1* | 9/2017 | Akita | G01C 21/3664 |

* cited by examiner

AUTOMATIC FULL SCREEN DISPLAY

FIELD

The subject matter described herein relates in general to in-vehicle navigation systems and, more particularly, to operation of in-vehicle navigation systems.

BACKGROUND

Modern vehicles commonly have an in-vehicle navigation system (NAV system). The NAV system may provide route guidance and position information about the vehicle. The NAV system uses a display screen to communicate information visually and a speaker to communicate information audibly. The NAV system can provide a variety of information and may be integrated with a variety of on-board vehicle systems or features. For example, the NAV system may be integrated with the music system (radio, satellite radio, cd player, DVD player, etc.), the on-board telephone phone system, climate control system, comfort and convenience system, etc. The screen may be configured to display the operational condition of these various systems either individually by using the full display screen or simultaneously by splitting the screen into multiple sections, each showing different systems. The splitting of the screen into multiple sections, however, limits the amount of information that may be effectively displayed and communicated to the user for any single system.

SUMMARY

An on-board vehicle navigation system (NAV system) may provide a variety of information and may be integrated with a variety of on-board vehicle systems or features. The NAV system may have the display set to show information about a single system in a full screen mode or have the display divided to show information about multiple systems simultaneously (mixed display mode). The NAV system may allow the user to select an automatic switching from a mixed display mode to a full display mode upon the occurrence of predetermined system conditions. The full display mode may be temporary and automatically return back to the previous display mode or may require a user acknowledgement prior to returning back to the previous display mode. The switch to the full display mode allows more information to be communicated to the user.

In one respect, the present disclosure is directed to an on-board navigation system for a vehicle having a display, a first subsystem and at least a second subsystem in the vehicle. Each of the first and second subsystem supplying information about an operational condition. The display is operable to display visual information about an operational condition of the first and second subsystems. The display has a full screen mode and a mixed display mode. The full screen mode corresponds to displaying operational information related to only one of the first and second subsystems on a majority portion of the display and the mixed display mode corresponds to displaying operational information about at least the first and second subsystems in discrete areas of the display. A controller is configured to monitor a predetermined condition associated with the first subsystem. When the predetermined condition is met, the controller is configured to cause the display to automatically switch to the full screen mode to display information specific to the predetermined condition. An electronic signal provided in response to a user selection selects which predetermined conditions associated with operation of an infotainment system cause the display to automatically switch to the full screen mode.

In another respect, the present disclosure is directed to a non-transitory computer-readable medium for displaying information within an on-board navigation system for a vehicle. The on-board navigation system includes a display, a first subsystem and at least a second subsystem. Each of the first and second subsystem supplying information about an operational condition. The display is operable to display visual information about an operational condition of the first and second subsystems. The display has a full screen mode and a mixed display mode. The full screen mode corresponds to displaying operational information related to only one of the first and second subsystems on a majority portion of the display and the mixed display mode corresponds to displaying operational information about at least the first and second subsystems in discrete areas of the display. The non-transitory computer-readable medium storing instructions that when executed by one or more processors cause the one or more processors to monitor a predetermined condition associated with the first subsystem and, when the predetermined condition is met, cause the display to automatically switch to the full screen mode to display information specific to the predetermined condition. An electronic signal provided in response to a user selection selects which predetermined conditions associated with operation of an infotainment system cause the display to automatically switch to the full screen mode.

In yet another respect, the present disclosure is directed to a method for displaying information within an on an on-board navigation system for a vehicle. The on-board navigation system includes a display, a first subsystem and at least a second subsystem. Each of the first and second subsystem supplying information about an operational condition. The display is operable to display visual information about an operational condition of the first and second subsystems. The display has a full screen mode and a mixed display mode. The full screen mode corresponds to displaying operational information related to only one of the first and second subsystems on a majority portion of the display and the mixed display mode corresponds to displaying operational information about at least the first and second subsystems in discrete areas of the display. The method includes monitoring predetermined conditions associated with a first subsystem. The method includes ascertaining if a user has authorized an automatic switch to a full screen mode for the monitored predetermined conditions. The method includes causing a display to automatically switch to the full screen mode to display information specific to the predetermined condition based on the predetermined condition and an authorization. The method includes ascertaining if a full screen mode event is concluded and returning from the full screen mode to a previous display mode after the full screen mode event is concluded.

DETAILED DESCRIPTION

Figure 1:
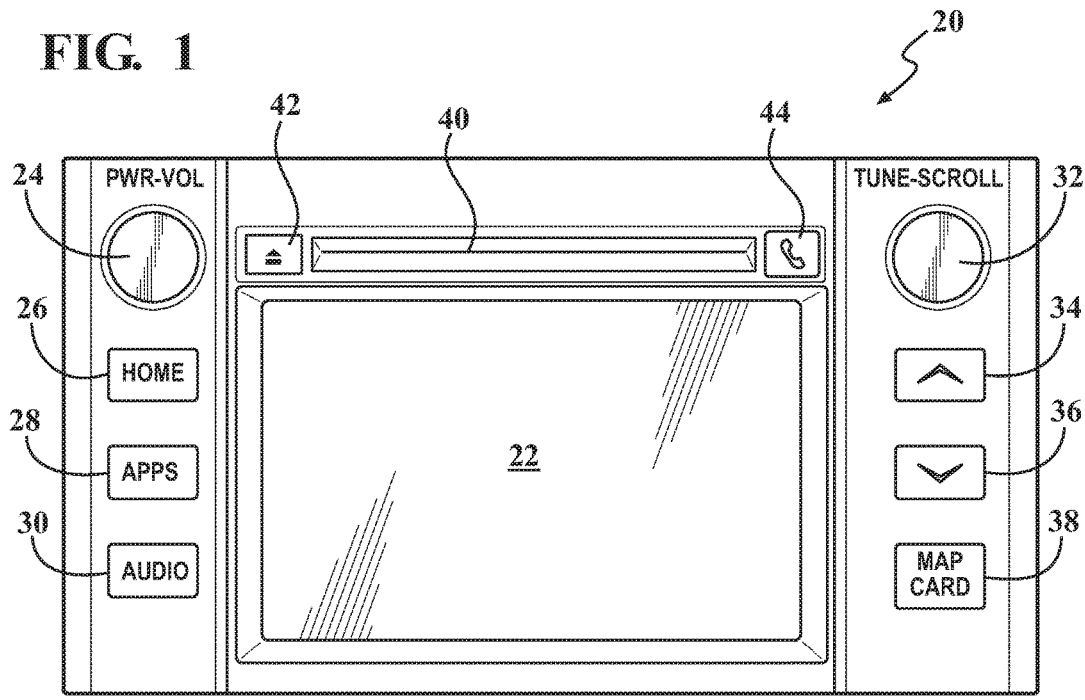
FIG. 1 is an example on-board vehicle navigation system interface and display.

This detailed description relates to on-board vehicle navigation systems (NAV systems). The NAV system may provide a variety of information and may be integrated with a variety of on-board vehicle systems or features, such the music system (radio, satellite radio, cd player, DVD player, etc.), the on-board telephone phone system, climate control system, comfort and convenience system, etc. The NAV system may have the display set to show information about a single system in a full screen mode or have the display divided to show information about multiple systems simultaneously (mixed display mode). The NAV system may allow the user to select an automatic switching from a mixed display mode to a full display mode upon the occurrence of predetermined system conditions. The full display mode may be temporary and automatically return back to the previous display mode or may require a user acknowledgement prior to returning back to the previous display mode. The switch to the full display mode allows more information to be communicated to the user.

Detailed embodiments are disclosed herein, however, it is to be understood that the disclosed embodiments are intended only as exemplary. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in the Figures, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Referring to FIG. 1, an example of an on-board vehicle NAV system 20 is shown. NAV system 20 includes a display 22 along with various interface controls. The interface controls, by way of example, may include a power/volume control 24, a home button 26, an apps button 28, an audio button 30, a tune/scroll control 32, an up selector 34, a down selector 36, a map/card selector 38, a disc slot 40, a disc eject selector 42 and a phone selector 44. The interface controls may be utilized to allow access and control over the various systems/functions controlled by NAV system 20. The various systems or functions may include route navigation, music, telephone, weather alerts, comfort, and convenience by way of example. The various systems or functions may each have various display configurations.

Figure 2:
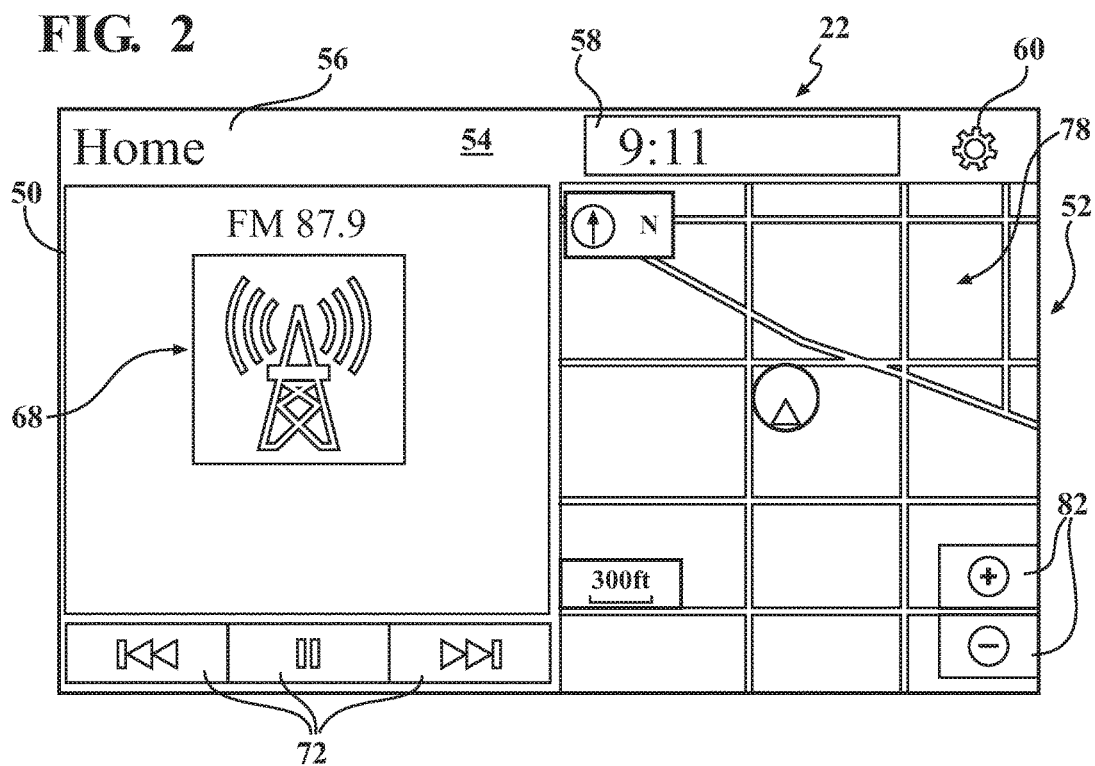
FIG. 2 is an example of a split screen display mode for the navigation system display of FIG. 1.
Figure 5:
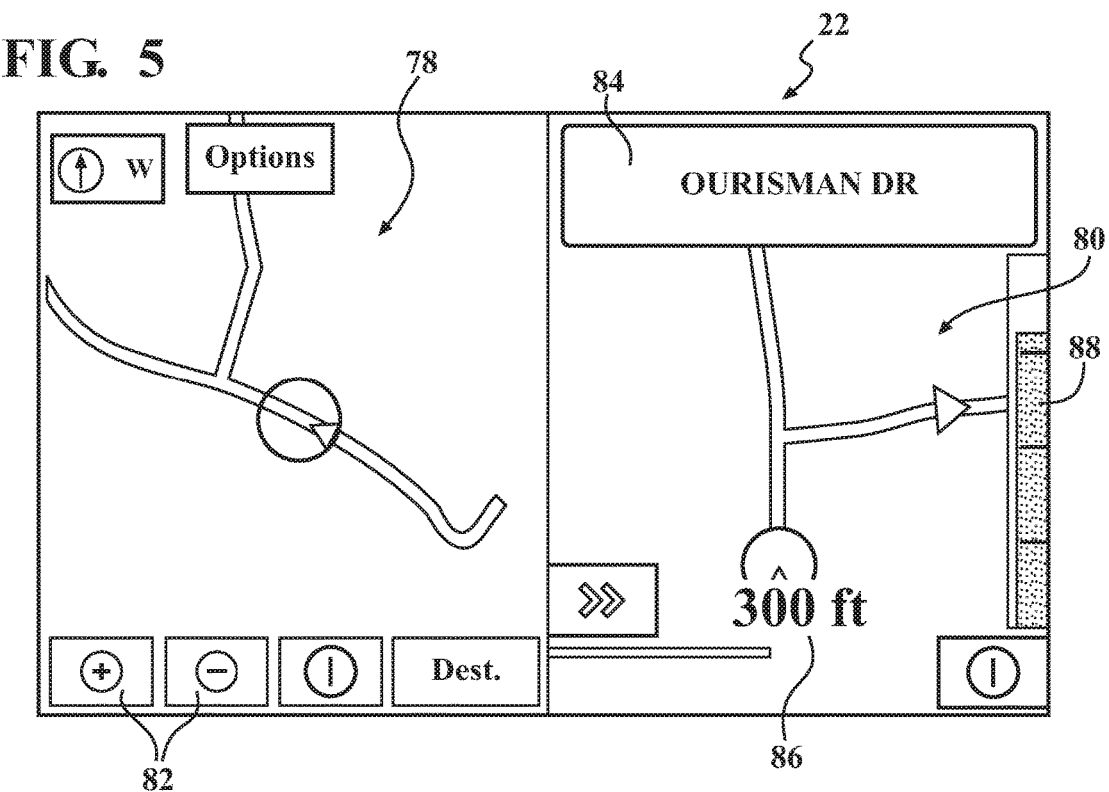
FIG. 5 is an exemplary view of a full screen mode for the occurrence of a predetermined navigation condition.

In one or more arrangements, NAV system 20 may have multiple display modes. In some display modes, a single system or function utilizes the entire display 22 (full screen mode). For example, as illustrated in FIG. 5, a full screen mode for the navigation feature is illustrated. In this mode, the entire area of display 22 may be used to convey operational information related to the navigation feature. In some display modes, multiple systems or functions each use a portion of display 22 (mixed display mode). For example, as illustrated in FIG. 2, display 22 may be separated into two major display areas—a first display area 50 and a second display area 52. In this example, operational information related to the music system, more particularly the radio system, is displayed in first display area 50 while operational information related to the navigation feature is displayed in second display area 52. Display 22 may also include a header display area 54 which may be used to display a limited amount of additional information that may be generic or un-related to the system being displayed in first or second display areas 50, 52. Header display area 54 is significantly smaller in display size than first and second display areas 50, 52 and utilizes only a minor portion of display 22 in order to display the additional information. In the example illustrated in FIG. 2, header display area 54 includes a HOME button 56, a time display 58 and a setting button 60. Display 22 may be a touch sensitive screen such that a user touching display 22 activates a function associated with the image/information being displayed. For example, touching HOME button 56 may result in NAV system 20 returning a default display condition associated with a root level of interface while touching setting button 60 may result in NAV system 20 changing to a setting display that allows the user to adjust the settings of NAV system 20. It should be appreciated that while header display area 54 is illustrated as being positioned on a top portion of display 22, it could be positioned only on a bottom portion of display 22. Moreover, in one or more arrangements a header display area 54 may be present in a full screen mode wherein the header display area 54 is again significantly smaller than the main display area communicating information associated with the feature using the full screen mode.

Figure 3:
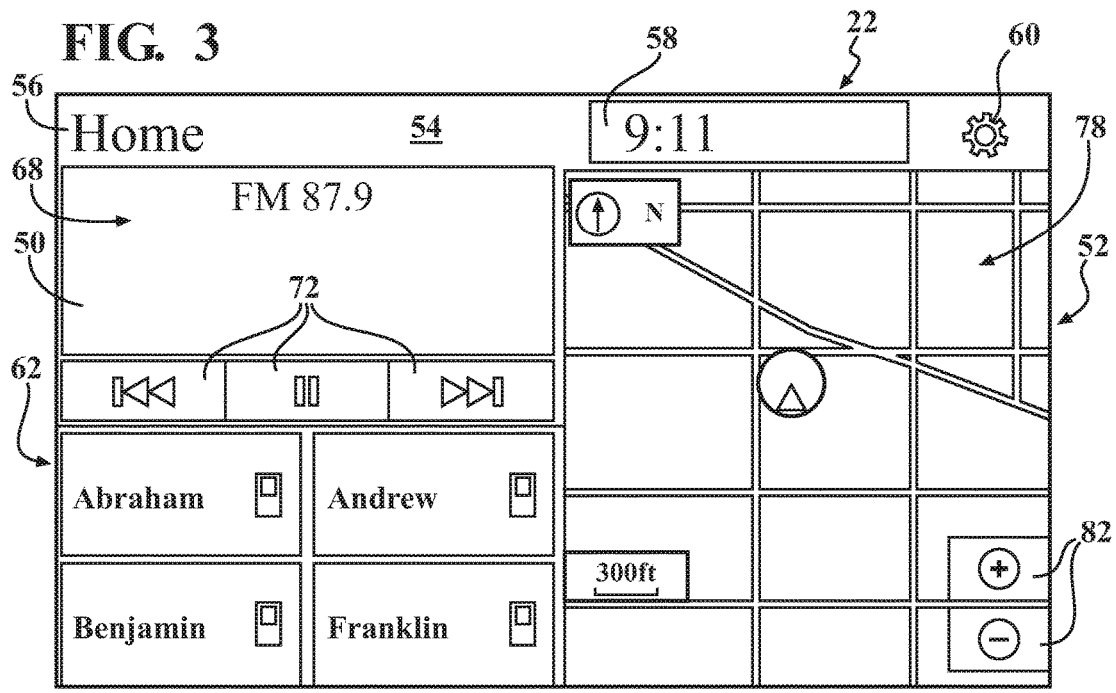
FIG. 3 is an example of another split screen display mode for the navigation system display of FIG. 1.

In one or more arrangements, NAV system 20 when in the mixed display mode may divide display 22 into more than two main display areas. For example, as illustrated in FIG. 3, display 22 may include three major display areas first and second display areas 50, 52 and a third display area 62. Each display area 50, 52, 62 is able to communicate information about different systems/functions. In this example, operational information related to the music system, more particularly the radio feature, is displayed in first display area 50 while operational information related to the navigation feature is displayed in second display area 52 and information related to the phone system is displayed in third display area 62. Also in this example, a header display area 54 is also illustrated. When there are multiple main display areas each of these display areas may of a same or a different size/dimension. For example, as shown in FIG. 2, first and second display areas 50, 52 may each be about the same size/dimension and occupy about one-half of display 22 below header display area 54. As another example, as shown in FIG. 3, second display area 52 may occupy about one-half of display 22 below header display area 54 while second and third display areas 50, 62 each occupy about one-quarter of display 22 below header display area 54. It should be appreciated that in one or more arrangements, there may be more than three main display areas and that the relative positioning, sizing and dimensions shown for the main display areas are merely exemplary and may differ from that illustrated.

The use of the mixed display mode allows information from multiple systems/features to be simultaneously displayed on display 22. However, the mixed display mode limits the amount of information that may be conveyed to the relatively smaller display area available as compared to the full screen mode. For example, discounting the presence or absence of a header display area 54, the largest main display area in a mixed display mode, as shown in FIG. 2, may be only about one-half of the display area in full screen mode, as shown in FIG. 5. Moreover, when the mixed display mode has more than two main display areas, the difference in the amount of information that can be conveyed may be even greater. For example, compare the relative size of the display area in FIG. 5 (full screen mode) to the size of first or third display areas 50, 62 in FIG. 3 which may each be about one-quarter the size. Thus, the availability of a full screen mode may be beneficially utilized to convey more information about a single system/feature to a user of NAV system 20 then when utilizing a mixed display mode. However, the mixed display mode may be beneficially utilized to convey information about multiple systems/features simultaneously to a user of NAV system 20. The mixed display mode may be more advantageous when a user does not need more information about the systems/features that may be displayed in the limited display areas associated with the mixed display mode.

Figure 6:
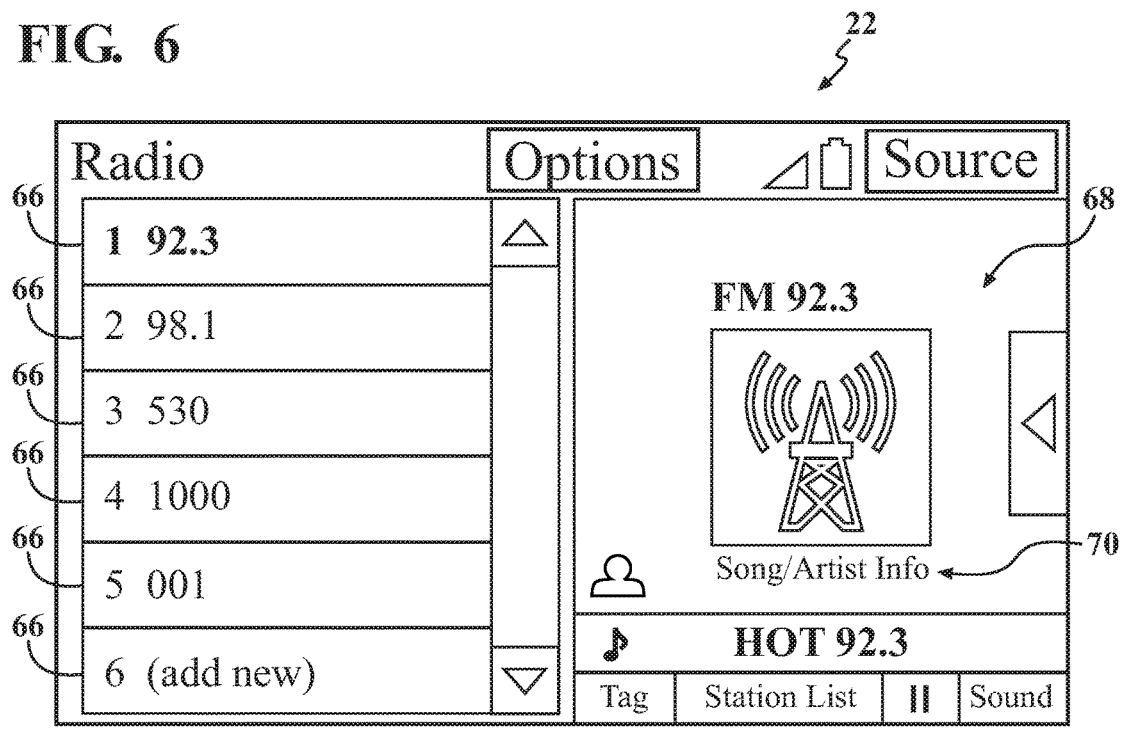
FIG. 6 is an exemplary view of a full screen mode for the occurrence of a predetermined radio condition.

In one or more arrangements, NAV system 20 may allow a user to select what display mode is to be utilized. For example, a user may choose to have NAV system 20 default to a mixed display mode. The number of display areas in a mixed display mode may be determined by the number of active systems or features. For example, when NAV system 20 is actively using a music function and a map display has been requested, NAV system 20 may have a mixed display mode with two main display areas as shown in FIG. 2. In the same example, if a phone is also connected to NAV system 20 the mixed display mode may have three main display areas as shown in FIG. 3. NAV system 20 may also allow a user to select a full screen mode when it is desired to have more detailed information or when only a single system/feature is active. For example, when NAV system 20 is actively using only a music function a full screen mode showing detailed information about the music feature may be displayed, as shown in FIG. 6 which is an exemplary full screen mode radio display. The detailed information may include a listing of the various station presets 66, details of the current station 68 and a listing of the song/artist 70. In contrast, when the radio display is shown in a mixed display mode, such as that in FIGS. 2 and 3, the displayed information may be limited to details of the current station 68 and advance, pause and previous station buttons 72. Thus, the full screen mode may provide a user with more information and in the example shown will provide song/artist information. Similarly, when the navigation feature is displayed in a full screen mode more information may be conveyed then when in a mixed display mode. For example, as shown in FIG. 5, in full screen mode displayed navigation feature information may include a route overview display 78 and a detailed route maneuver display 80 while when in a mixed display mode, as shown in FIGS. 2 and 3, may include only route overview display 78. It should be appreciated that the route overview display may be zoomed in/out with zoom buttons 82. Route maneuver display 80 may include additional information, such as the next street name 84, a distance to intersection reading 86 and a remaining distance bar 88. Thus, the full screen mode may provide a user with more navigation information and in the example shown will provide detailed route maneuver information 80.

Figure 4:
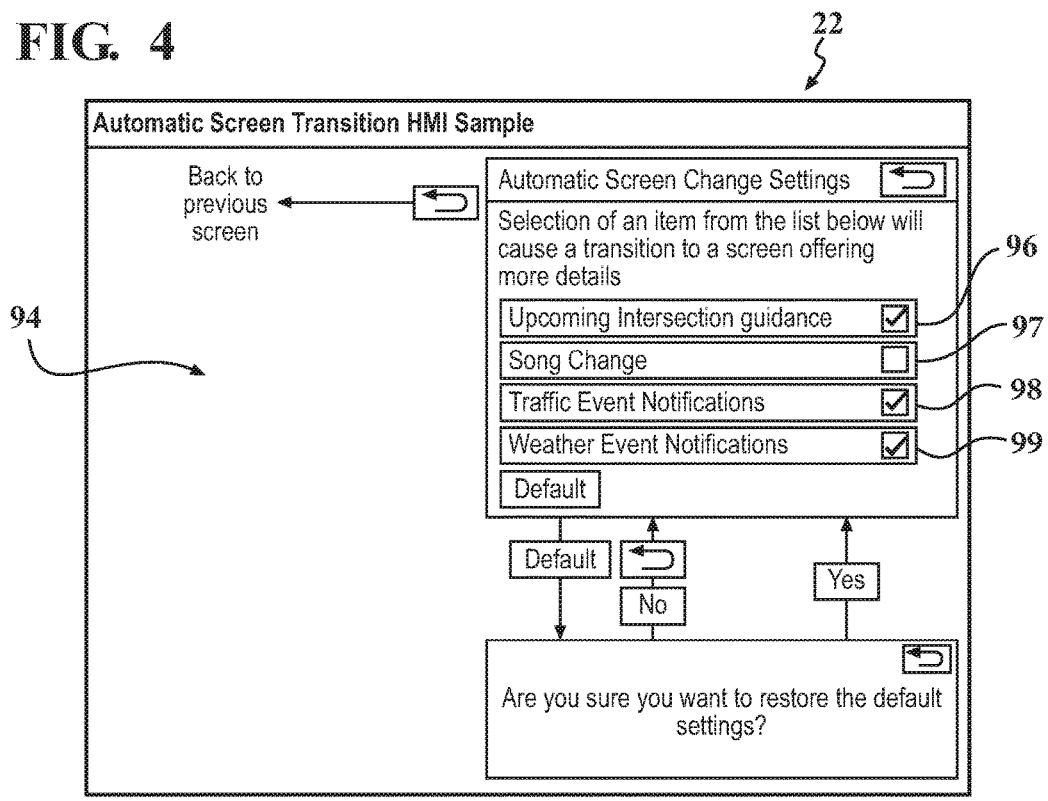
FIG. 4 is an exemplary user interface allowing selection of automatic full screen display mode upon the occurrence of predetermined system conditions.
Figure 7:
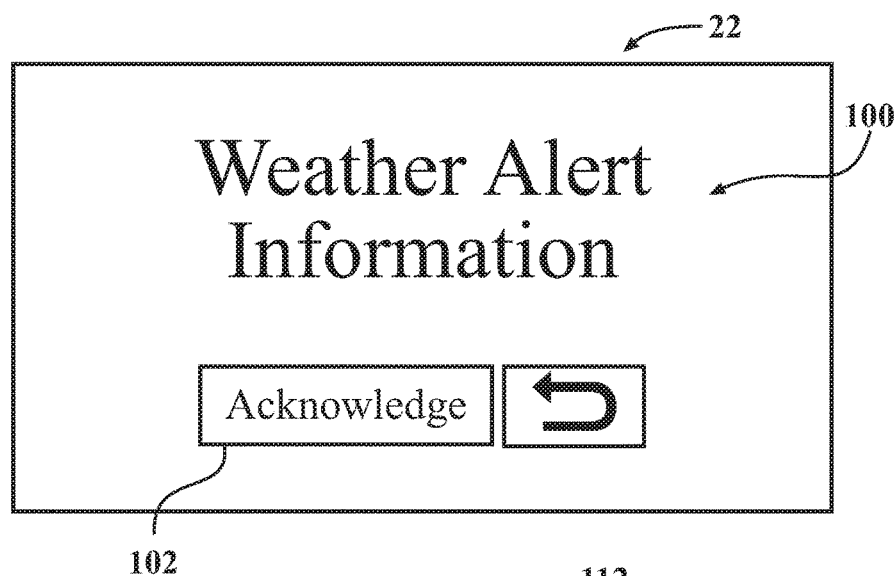
FIG. 7 is an exemplary view of a full screen mode for the occurrence of a predetermined weather condition.

In one or more arrangements, NAV system 20 is operable to automatically switch to a full screen mode upon the occurrence of predetermined system conditions. The automatic switch may be selected by the user or may be hard programmed into NAV system 20. Referring to FIG. 4, an exemplary user selection screen 94 to select the automatic screen change settings is shown. In selection screen 94 the user may select to have an automatic transition from a mixed display mode (or a full screen mode displaying another feature) to a full screen mode showing information related to the occurrence of a predetermined system condition. In this example, the user can select to have NAV system 20 automatically switch to full screen mode by checking the associated box for an upcoming intersection guidance 96, a song change 97, a traffic event notification 98 and a weather event notification 99. In the example shown, all of the boxes are selected except for song change 97. The predetermined system conditions shown in FIG. 4 are exemplary and other predetermined system conditions may be offered, such as for a music station change or a music source change by way of non-limiting example. This selectable nature allows a user to customize their experience with NAV system 20. In one or more arrangements, some of the predetermined system conditions may be hard programmed such that they are not user selectable and, rather, happen automatically. For example, a weather alert may be hard programmed such that a full screen mode is automatically activated upon the occurrence of a predetermined weather condition. In one or more arrangements, the predetermined system conditions that cause the automatic switching to full screen mode may be based on various parameters or conditions. The music system may use the following predetermined conditions to cause automatic switching from mixed display mode to full screen mode: (1) a new song is being played; (2) a new radio station has been selected; and/or (3) a new music source has been selected. Another predetermined condition that may cause the automatic switching to full screen mode may be when NAV system 20 receives a weather alert. For example, as shown in FIG. 7, when a weather alert is received, NAV system 20 may switch to a full screen mode and display weather alert information 100. The weather alert information may contain detailed information about the nature of the alert, the geographic area affected, and the start time and duration of the weather event by way of example. Weather alert information may be communicated to NAV system 20 by various means such as, for example, through a Bluetooth or Wi-Fi connection to a smart phone, over a USB or other direct hardwired connection from an embedded modem within the vehicle. As another example, weather information may be communicated to an antenna on the vehicle connected to NAV system 20 via radio waves, micro-waves or some other band in the electromagnetic spectrum from either satellite or terrestrial broadcast antennas.

In one or more arrangements, the occurrence of predetermined conditions associated with the route guidance system may cause the automatic switching to full screen mode from a mixed display mode. For example, when the route guidance system is active it may be desirable to provide additional information about an upcoming maneuver and utilize the full screen mode to convey that additional information. The parameters that determine when to perform the automatic switch to display information about an upcoming maneuver may include: (1) number of traffic lanes; (2)

vehicle or road speed; (3) complexity of the maneuver; (4) number of maneuvers required within a certain period of time or distance; (5) amount of traffic; (6) proximity to the maneuver; (7) time of any voice prompt; (8) time of day and location; and/or (9) the existence of a geofence. Each of these parameters can be assigned a value of 0 or 1 for a particular situation where NAV system 20 may perform the automatic switching to full screen mode when the value is 1 and may remain in the current display mode when the value is 0. Each of these parameters may be evaluated individually, collectively or not at all depending on the settings. For example, only some of the parameters may be active or utilized by NAV system 20 while others are not active. Additionally, some parameters may dominate the others, as described below. The parameters and their associated values may be based on providing additional information (full screen mode) when it is believed the additional information will aid in the successful completion of the maneuver.

The number of traffic lanes parameter, by way of example, may be assigned a value of 0 if there is only a single traffic lane in each direction and a value of 1 if there are two or more traffic lanes in each direction. The vehicle or road speed parameter, by way of example, may be assigned a value of 0 if the speed is less than a predetermined value and a value of 1 if the speed exceeds the predetermined value. The speed may be relevant because it provides a window into the time a driver will have to make the upcoming maneuver.

The complexity of the maneuver parameter, by way of example, may be assigned a value of 0 if the maneuver is at an intersection of four or less options and a value of 1 if the intersection has more than four options or if the intersection is not an approximately perpendicular intersection. In this manner a more complex maneuver will be displayed in a full screen mode while a more traditional maneuver will not result in full screen mode. The number of maneuvers required parameter, by way of example, may be assigned a value of 0 if there is a single maneuver within a predetermined period of time or distance and a value of 1 if there is a second maneuver required within the predetermined period of time or distance.

The amount of traffic parameter, by way of example, may be assigned a value of 0 if the traffic level is low and a value of 1 if the traffic level is high. The low and high designation may be based on a traffic density on the route proximate to the maneuver location. The proximity to the maneuver parameter, by way of example, may be assigned a value of 0 if the proximity is greater than a predetermined distance and a value of 1 if the proximity is less than the predetermined distance. The time of voice prompt parameter, by way of example, may be assigned a value of 0 if the voice prompt is more than a predetermined time away and a value of 1 if the voice prompt is less than the predetermined time away. The time of day and location parameter, by way of example, may be assigned a value of 0 if there is expected to be light traffic at that particular time of day and location and a value of 1 if there is expected to be heavy traffic at that particular time of day and location. The expected traffic level may be based on historical data on NAV system 20 or provided to NAV system 20.

The geofence parameter, by way of example, may be assigned a value of 0 if the vehicle is within a predetermined geofence area and a value of 1 if the vehicle is outside of the predetermined geofence area. The geofence area may be based on the particular driving history of the vehicle on which NAV system 20 is being utilized. For example, if the vehicle travels (or has traveled) a particular route frequently it may be assumed that the driver knows that route (and the associated maneuvers) well and NAV system 20 may define that route as a geofence area. The familiarity of the driver with that route and the maneuvers may allow the driver to rely on the voice prompts for the guidance and the mixed display mode. The switching to a full screen mode may not provide any additional value. The frequency required for a route to become a geofence area, by way of example, may be based on the number of times that maneuver has been performed and/or the frequency (number of times in a particular time frame) at which that maneuver is performed. NAV system 20 may reset or remove the geofence(s) at a predetermined interval and require them to be re-established based on current driving patterns/behavior.

In one or more arrangements, NAV system 20 may automatically switch from mixed display mode to full screen mode when any active parameter has a value of 1 regardless of the value of the other active parameters. In one or more arrangements, an active parameter may dominate over the other active parameters such that the value of the dominate parameter may dictate whether automatic switching occurs. For example, the geofence parameter may be a dominate parameter and when active may dictate that automatic switching does not occur when the vehicle is within a geofence area (parameter value of 0) and may allow switching when the vehicle is not within a geofence area (parameter value of 1). It should be appreciated that when the geofence parameter has a value of 1 NAV system 20 does not automatically go into full screen mode, rather, with the value of 1 the geofence parameter does not prevent the automatic switching for full screen mode based on the value of other active parameters.

In one or more arrangements, the automatic switching from mixed display mode to full screen mode may be temporary in nature. In the case of the music system the switch to full screen mode may last for a predetermined time period and then return to the previous display mode. The predetermined time period for the music system switch may be three seconds, by way of example. In the case of the route guidance system the switch to full screen mode may last until the associated maneuver(s) is completed. In the case of the weather alert feature, the switch to full screen mode may last for a predetermined time period and then return to the previous display mode or may require a driver acknowledgement before returning to the previous display mode. For example, an acknowledgment button 102, as shown in FIG. 7, may be present when displaying weather alert information 100. Weather alert information 100 may continue to be displayed in full screen mode until the driver acknowledges the alert by pressing the acknowledgment button 102. NAV system 20 may also make an audible alert when a weather alert condition has occurred.

Figure 8:
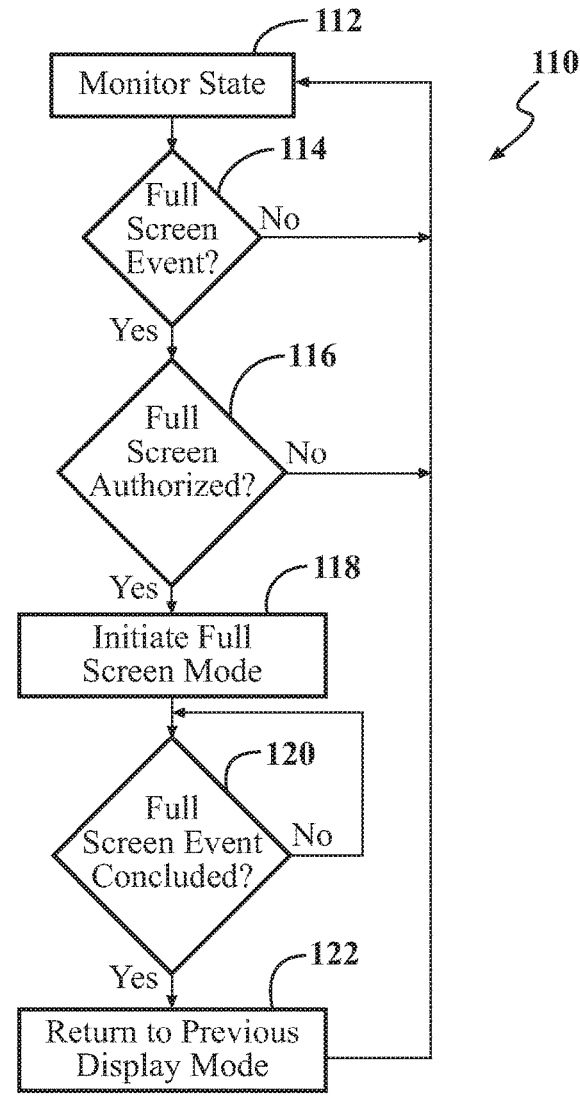
FIG. 8 is a flow chart illustrating an exemplary control scenario for automatically switching between a current display mode and a full screen display mode.

In one or more arrangements, NAV system 20 may use the control scenario 110, shown in FIG. 8, to control the automatic switching from mixed display mode to full screen mode upon the occurrence of a predetermined condition. NAV system 20 monitors the operational state, as indicated in block 112. NAV system 20 ascertains is a full event has occurred, as indicated in decision block 114. For example, NAV system 20 may review the values of the various parameters to determine if there is a value of 0 or 1. In the event there is no full screen event, NAV system 20 will return to block 112 and monitor the operational state. If there is a full screen event, NAV system 20 will determine if a switch to full screen mode is authorized, as indicated in decision block 116. In this determination, NAV system 20 may review the user's authorizations (such as the user's selections shown in FIG. 4). NAV system 20 may also look to see if a geofence is present such that a switch to full screen mode is not authorized. NAV system 20 may also look to see if the predetermined condition is one that does not require user authorization, such as a weather alert. If a switch to full screen mode is not authorized, NAV system 20 will return to block 112 and monitor the operational state. If a switch to full screen mode is authorized, NAV system 20 will initiate full screen mode, as indicated in block 118. NAV system 20 will then determine if the condition for the full screen mode has concluded, as indicated in decision block 120. If the condition has not concluded, NAV system 20 will maintain the full screen event until such time as the condition has concluded. The conclusion may be based on the passage of a predetermined time period, the completion of a navigation maneuver, and/or an acknowledgment from the driver as discussed above. Once NAV system 20 has determined that the full screen event has concluded, NAV system 20 returns to the previous display mode, as indicated in block 122, and returns to block 112 to monitor the operational state.

It will be appreciated that arrangements described herein can provide numerous benefits, including one or more of the benefits mentioned herein. NAV system 20 may have display 22 set to show information about a single system in a full screen mode or have display 22 divided to show information about multiple systems simultaneously (mixed display mode). NAV system 20 may allow the user to select an automatic switching from a mixed display mode to a full display mode upon the occurrence of predetermined system conditions. The full display mode may be temporary and automatically return back to the previous display mode or may require a user acknowledgement prior to returning back to the previous display mode. The switch to the full display mode allows more information to be communicated to the user. The various display configurations may account for the amount of display area available. For example, when an entire area of display 22 is available a full set of information may be displayed and when a limited area of display 22 is available a subset of information may be displayed.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . ." as used herein refers to and encompasses any and all possible combinations of one or more of the associated listed items. As an example, the phrase "at least one of A, B and C" includes A only, B only, C only, or any combination thereof (e.g. AB, AC, BC or ABC). The term "operatively connected" as used throughout this description, can include direct or indirect connections, including connections without direct physical contact.

Aspects herein can be embodied in other forms without departing from the spirit or essential attributes thereof. Accordingly, reference should be made to the following claims, rather than to the foregoing specification, as indicating the scope of the invention. It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means . . . plus-function format and are not intended to be interpreted based on 35 U.S.C. 112, sixth paragraph, unless and until such claim limitations expressly use the phrase "means for" followed by a statement of function void of further structure.

What is claimed is:

1. An on-board navigation system for a vehicle comprising:
   a first subsystem and at least a second subsystem in the vehicle, each of the first and second subsystem supplying information about an operational condition;
   a display operable to display visual information about an operational condition of the first and second subsystems, the display having a full screen mode and a mixed display mode, wherein the full screen mode corresponds to displaying operational information related to only one of the first and second subsystems on a majority portion of the display and the mixed display mode corresponds to displaying operational information about at least the first and second subsystems in discrete areas of the display; and
   a controller configured to monitor a predetermined condition associated with the first subsystem and, when the predetermined condition is met, configured to cause the display to automatically switch to the full screen mode to display information specific to the predetermined condition,
   wherein an electronic signal provided in response to a user selection selects which predetermined conditions associated with operation of an infotainment system cause the display to automatically switch to the full screen mode.

2. The on-board navigation system of claim 1, wherein the predetermined conditions include a new song.

3. The on-board navigation system of claim 1, wherein the predetermined conditions include a new station.

4. The on-board navigation system of claim 1, wherein the predetermined conditions include a complexity of an upcoming maneuver.

5. The on-board navigation system of claim 1, wherein the predetermined conditions include a number of maneuvers within a predetermined period associated with an upcoming maneuver.

6. The on-board navigation system of claim 1, wherein the predetermined conditions include a geofence and the display maintains a current display mode when within the geofence regardless of the other predetermined conditions and any associated maneuver.

7. The on-board navigation system of claim 1, wherein the predetermined conditions include a time of a voice prompt associated with an upcoming maneuver.

8. The on-board navigation system of claim 1, wherein the predetermined conditions include at least one of a severe weather condition occurring in proximity to a current location and a location along a route guidance.

9. The on-board navigation system of claim 1, wherein after a predetermine period the display returns to its previous display mode after automatically switching to the full screen mode.

10. The on-board navigation system of claim 1, wherein the display remains in the full screen mode until a user acknowledgement is received.

11. A non-transitory computer-readable medium for displaying information within an on-board navigation system for a vehicle,
   the on-board navigation system including:
      a first subsystem and at least a second subsystem, each of the first and second subsystem supplying information about an operational condition,
      a display operable to display visual information about an operational condition of the first and second subsystems, the display having a full screen mode and a mixed display mode, wherein the full screen mode corresponds to displaying operational information related to only one of the first and second subsystems on a majority portion of the display and the mixed display mode corresponds to displaying operational information about at least the first and second subsystems in discrete areas of the display; and
   the non-transitory computer-readable medium storing instructions that when executed by one or more processors cause the one or more processors to monitor a predetermined condition associated with the first subsystem and,
   when the predetermined condition is met, cause the display to automatically switch to the full screen mode to display information specific to the predetermined condition,
   wherein an electronic signal provided in response to a user selection selects which predetermined conditions associated with operation of an infotainment system cause the display to automatically switch to the full screen mode.

12. The non-transitory computer-readable medium of claim 11, wherein the predetermined conditions include at least one of a new song, a new station, and a new source.

13. The non-transitory computer-readable medium of claim 11, wherein the predetermined conditions include a complexity of an upcoming maneuver, a number of maneuvers within a predetermined period associated with an upcoming maneuver, a time of day relative to a current location, a timing of a voice prompt, and a geofence,
   wherein the display maintains a current display mode when within the geofence regardless of the other predetermined conditions and any associated maneuver.

14. The non-transitory computer-readable medium of claim 11, wherein the predetermined conditions include at least one of a severe weather condition occurring in proximity to a current location and a location along a route guidance.

15. A method for displaying information within an on-board navigation system for a vehicle,
   the on-board navigation system including:
      a first subsystem and at least a second subsystem, each of the first and second subsystem supplying information about an operational condition,
      a display operable to display visual information about an operational condition of the first and second subsystems, the display having a full screen mode and a mixed display mode, wherein the full screen mode corresponds to displaying operational information related to only one of the first and second subsystems on a majority portion of the display and the mixed display mode corresponds to displaying operational information about at least the first and second subsystems in discrete areas of the display; and
   the method comprising:
      monitoring predetermined conditions associated with a first subsystem;
      ascertaining if a user has authorized an automatic switch to a full screen mode for the monitored predetermined conditions;
      causing a display to automatically switch to the full screen mode to display
      information specific to the predetermined condition based on the predetermined condition and an authorization;
      ascertaining if a full screen mode event is concluded; and
      returning from the full screen mode to a previous display mode after the full screen mode event is concluded.

16. The method of claim 15, wherein monitoring the predetermined conditions associated with the first subsystem includes monitoring at least one of a song change, a station change and a source change.

17. The method of claim 15, wherein monitoring the predetermined conditions associated with the first subsystem includes monitoring at least one of a complexity of an upcoming maneuver, a number of maneuvers within a predetermined period associated with an upcoming maneuver, a time of day relative to a current location, and a timing of a voice prompt,
   and
      wherein ascertaining if the full screen mode is authorized includes ascertaining if a current location is within a geofence and maintaining a current display mode when within the geofence regardless of the other predetermined conditions associated with the first subsystem and any associated maneuver.

18. The method of claim 15, wherein monitoring the predetermined conditions associated with the first subsystem includes monitoring at least one of a severe weather condition occurring in proximity to a current location and a location along a route guidance.

* * * * *